United States Patent

McCarthy, Jr.

[15] 3,652,987

[45] Mar. 28, 1972

[54] SYNCHRONIZATION VERIFYING SYSTEM

[72] Inventor: Justin H. McCarthy, Jr., Boca Raton, Fla.

[73] Assignee: International Business Machines Corporation, Armonk, N.Y.

[22] Filed: June 29, 1970

[21] Appl. No.: 50,684

[52] U.S. Cl. .......................... 340/146.1, 197/1 R, 235/92 EC

[51] Int. Cl. .......................... G08c 25/00

[58] Field of Search .......................... 340/146.1, 146.3, 174.1 B; 235/92 EC; 197/1; 101/93

[56] References Cited

UNITED STATES PATENTS 3,519,988 7/1970 Grossman .......................... 340/146.1
3,193,812 7/1965 Friend .......................... 340/174.1
3,483,510 12/1969 Widl .......................... 340/146.1

*Primary Examiner*—Charles E. Atkinson
*Attorney*—Hanifin and Jancin and Earl C. Hancock

[57] ABSTRACT

Emitter pulses generated in groups are checked to determine whether or not the correct number are present in each group. The pulses are introduced to a counter, the contents of which is inspected by appropriately timed gating whenever a count equivalent to a full pulse group should be present. The inspection circuitry is controlled so as to accommodate acceptable odd spacing in the pulse groups.

9 Claims, 5 Drawing Figures

INVENTOR
JUSTIN H. McCARTHY, JR.

BY Earl C. Hancock

ATTORNEY

PATENTED MAR 28 1972 3,652,987

SYNCHRONIZATION VERIFYING SYSTEM

BACKGROUND OF THE INVENTION

1. Field of the Invention

This invention relates to circuitry for testing proper synchronization of systems controlled by discrete groups of pulses. More particularly, this invention relates to logic circuitry for verifying the existence of the correct number of pulses which occur in discrete groups wherein each group of pulses is suitable for use in controlling a sequence of operations. The invention is particularly useful in data processing equipment controlled serial wire matrix printers for verifying that the proper number of control pulses have been generated in each of a series of pulse groups with each individual pulse representing a potential print wire trigger.

This synchronization verifying apparatus is well suited for handling acceptable special situations which result in odd spacings of the pulses within groups such as occur during startup or during speed shifting in a serial wire matrix printer.

2. Description of the Prior Art

Printers which use preformed character printing elements or wire matrix printers which simultaneously energize all dot printing wires to print a complete character have used count checking apparatus for determining that the correct number of characters have been printed across a complete line. These printers generally have employed counters which were preset and decremented to zero with the counter being checked for a cleared condition when the end of line is detected or have incremented the counter until end of line is detected and then compared its contents with a preset count. Arrangements for performing these operations are shown in U.S. Pat. No. 3,066,601 by H. E. Eden, U.S. Pat. No. 3,312,174 by J. M. Cunningham and U.S. Pat. No. 3,289,576 by Bloom et al, all assigned to the same assignee as this patent.

Serial wire matrix printers print one column or row of dots at a time. Characters are composed by sequential printing of these rows or columns. Such printers in the prior art require acceptance of many undesirable restrictions such as the requirement that the print head be up to speed before encountering the first printing position and that this speed be maintained for the entire line of characters being printed. The failure of any print position to be properly energized or the loss of synchronization which might cause erroneous shifting of printing from one character to the next is generally not detected unless a parity error or character line count error is detected at the end of the line. Other prior art systems which check each row or column as it is printed respond to errors by promptly stopping all operations. An effort to maintain partial synchronization by increasing or decreasing the speed of control pulses is shown in the IBM Technical Disclosure Bulletin article entitled "Clock Speed Control Circuit" by V. C. Martin, Vol. 12, No. 3, Aug. 1969, Pages 401–403. As in the other prior art systems, however, this article does not detect an error condition until an end of line is encountered.

SUMMARY OF THE INVENTION

The present invention is an arrangement of logic circuitry for determining that the proper number of pulses have occurred within each of a series of discrete pulse groups. As the pulses occur within any given group, they are used to increment a counter with the content of that counter being inspected following a timeout function which effectively senses the gaps between pulse groups. That is, the pulses of a given group can be normally expected to recur with a predetermined period of time between pulses. The pulse groups are separated by time gaps which are considerably larger than the time gaps between any two pulses within a group. Thus, an integrator circuit might be used with an appropriate time constant to respond to each pulse within a group so that its output can be used to generate a signal indicating that a time between pulses has occurred which exceeds the normal pulse spacing within a group. The output of this integrator could be used to gate inspection circuitry to determine whether or not an acceptable number of pulses have been counted for that group. The invention can be easily adapted to accommodate decrementing of a counter to zero or inspecting counter contents within predetermined tolerance ranges.

In addition, the counter and count inspection circuitry can be modified to include logic circuitry for detecting the existence of special pulse spacing conditions and for preventing the inspection circuitry from erroneously responding to these conditions. For instance, it may be desirable in a serial wire matrix printer to begin printing as the print head is being brought up to speed. Under those circumstances the initial pulse of the first group would occur with relatively large spacings in a manner which is acceptable but which might cause an incorrect error indication from the inspection circuitry because of the timeout circuit operation. Thus the invention can be modified to include logic for recognizing that a startup operation has begun and for preventing response to the integrator output until after pulse recurrence has stabilized.

Another possible modification of this invention involves responding to the special condition of pulse groups occurring at an excessively fast rate and reducing to the print speed rate. In a serial wire matrix printer it may be desirable to move the print head at a relatively fast speed when not printing such as in a tabbing operation and to reduce the print head motion to the printing speed so as to continue printing at a more remote location on the paper. The present invention can be modified to recognize the shift from high to low speed and to respond to it by effectively disabling the error indicator portion of the count inspection circuitry while permitting it to continue counting the pulses on a recycling basis until after the print head movement has stabilized at the lower printing speed. Resynchronization of the counting is then effected when speed stabilization is recognized. Thus, this same modification can permit continued counting of the pulses regardless of print head speed.

An object of this invention is to provide circuitry which indicates whether or not an acceptable number of pulses have occurred in each of a sequence of recurring pulse groups.

Another object of this invention is to provide logic circuitry which sense that acceptable sync pulse spacings are occurring so as to prevent inaccurate indications of error conditions.

Still another object of this invention is to provide logic circuitry for counting the emitter pulses for a wire matrix printer so as to indicate an error condition if the pulses of a discrete group are not of an acceptable quantity.

Yet another object of this invention is to provide logic circuitry for preventing count inspection circuitry in a serial wire matrix printer from improperly indicating an error condition during print head start up operations.

A further object of this invention is to provide logic circuitry for detecting that a high to low speed transition has occurred for movement of the head in a serial wire matrix printer so as to properly time the operation of the count inspection circuitry after stabilization of print head speed.

The foregoing and other objects, features and advantages of the present invention can be more fully understood from the following detailed description of the present invention.

DETAILED DESCRIPTION

Figure 1:
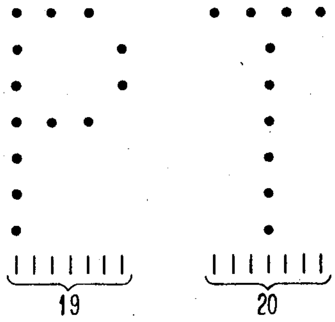
FIG. 1 illustrates the type of characters which might be printed by a serial wire matrix print head.

For purposes of understanding, the preferred embodiment of this invention will be described in conjunction with a serial wire matrix printer using a 7 × 7 matrix. The printing is effected by a wire print head arranged with seven printing wires in a vertical column arrangement with this head being moved horizontally across the paper. Thus, if the characters "PT" shown in FIG. 1 are to be printed by such a print head, the print head might be moved from left to right across the paper so that the column of dots along the left-most edge of the "P" is first printed, the dots in each column are then sequentially printed moving the head from left to right, and finally the last dot in the upper right-hand portion of the "T" would be printed.

Serial wire matrix printer attachments using closed loop operation require feedback from the printer which indicates the mechanical location of the print head. Typically this feedback is generated in the form of electronic pulses from a magnetic emitter pickup. Each wire hammer option time constitutes one signal and an emitter pulse which might generate such an option time is shown under each vertical column in FIG. 1. FIG. 1 illustrates two groups, 19 and 20, of seven wire matrix print head option times each of which corresponds with a potential vertical column of the character being printed. The particular type font used to print the characters of FIG. 1 is arranged such that no wire matrix hammer need be actuated for two sequential columnar positions as are represented by the emitter pulses in groups 19 and 20, thereby increasing the printing speed. Accordingly the actual printed characters appear as a 4 × 7 matrix even though they actually are being controlled by an effective 7 × 7 matrix comprised of the vertical arrangement of seven print wires and the seven horizontal print hammer option pulses from the emitter shown horizontally in groups 19 and 20. The seven emitter pulses contained in discrete pulse groups 19 and 20 are counted in accordance with the present invention to determine whether or not the printer is operating in synchronization as between the commands to the print head and the location of that print head relative to the paper or receiving medium.

Figure 2:
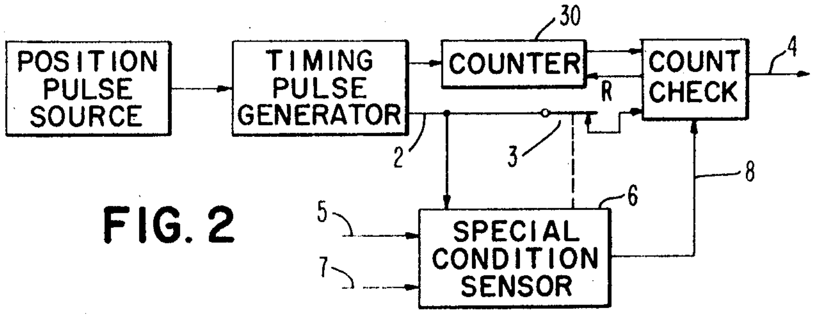
FIG. 2 presents a somewhat idealized system organization of the present invention including special pulse spacing responding modifications.

A broad understanding of the operation and features of the present invention can be obtained from FIG. 2 which broadly presents the invention in block form. The position pulse source for a serial matrix printer capable of printing characters similar to those shown in FIG. 1 would generate sequences of discrete pulse groups such as 19 and 20, each of which might include seven emitter pulses from a feedback system. The timing pulse generator responds to these pulses by introducing a count pulse to counter 30 for each of the emitter pulses received. Circuitry for providing a timeout function such as a single shot type circuit or an integrator circuit would also be included within the timing pulse generator circuitry and would be arranged so that a signal would be produced on line 2 whenever a time elapsed between two sequential pulses from the original source sufficient to indicate that the end of a pulse group has occurred. These pulses would be passed through normally closed switch 3 into the count check circuitry which would inspect the counter 30 to determine whether or not it contained a count of seven. If not, a sync check signal would be produced on terminal 4. That is, an integrated emitter pulse or timeout pulse on 2 indicates that a full character span such as 19 or 20 has been passed and that the counter can be inspected. The counter is then reset to zero regardless of whether or not an error occurred so as to be ready to inspect the next received character.

The system thus far described provides a certain degree of intelligence relative to error conditions. For instance, a certain number of characters containing erroneous printing may be acceptable for an entire line of print under some circumstances. Therefore, the number of sync check pulses appearing at 4 during an entire line may be acceptable and ignored so that the printing may continue. If the number of such pulses exceeds a predetermined limit, a significant error condition may be concluded to exist and appropriate corrective action taken. In prior art systems, the existence of an error condition during printing might typically result in immediate cessation of all operations. Of course, if it is determined in advance that any error condition in a line of characters will be unacceptable, the signal at 4 from this invention could likewise be employed to cease operations or to institute recovery or corrective procedures. The generation of sync check pulses and the continued resynchronization as is possible with this invention is particularly well suited to data processing or computer controlled operations.

Prior art printers using wire matrix print heads have required that the print head be up to full speed at the time that it reaches the extreme margin wherein printing can occur. One aspect of the present invention permits printing to commence from a standing start of the print head while still maintaining synchronism. The problem under these circumstances is that the pulses of the initial character group will commence occurring with a spacing in time which exceeds the timeout capabilities of the timing pulse generator. This means that the first emitter pulse begins the timeout operation which results in a signal appearing at 2 before the second pulse arrives. This causes a sync check signal at 4 and resetting of counter 30. If the spacing between the second and third pulses likewise exceeds the timeout, yet another sync check appears at 4. Accordingly a multiplicity of error signals could be generated during printing of the first character notwithstanding that such a character was correct. To accommodate these circumstances, the command initiating printing from a stand-still would be introduced to terminal 5 and the special condition sensor 6 would respond to this signal by opening normally closed switch 3 and preventing the erroneous timeout signal at 2 from effecting any operations by the count check circuitry. Circuit 6 would maintain switch 3 in the open condition for a period of time sufficient to insure that the pulse spacings should begin arriving correctly. In a 7 × 7 matrix such as is here described, only three pulses need typically be ignored before switch 3 can be closed by 6 to cause the system to continue responding as described above for the remainder of the printed line.

The movement of the print head for nonprinting functions such as during tab operations generally would be effected at a considerably faster speed than is used for the printing speed. All of the circuitry described thus far can be designed to easily handle such a circumstance except for the integrated emitter output 2. This timeout type signal is dependent upon a predetermined time period occurring between pulse groups such as between the last pulse of group 19 and the first pulse of group 20. When high speed print head movement is being effected, this spacing between pulse groups may be insufficient to permit a signal to be produced on line 2. Therefore, the special condition sensor circuit 6 would receive a signal on terminal 7 indicating that high speed operations are occurring and would respond by introducing a conditioning signal on line 8 to the count check circuitry so as to temporarily disable the sync check signal generating circuit. In addition, this causes coupling of a feedback reset signal to counter 30 each time counter 30 obtained a count of seven. A detected sync check probably would not effect the end result during execution of such a high speed command since the attachment would be maintaining synchronism within itself and since minor differences in physical positioning of the head are not of as significant a consequence during high speed operation. In any event, the shifting to a lower speed preparatory for printing would likewise be detected by the drop of the signal at 7. The first pulse on 2 thereafter indicates sufficient print speed stabilization to cause the count check circuitry to return to normal operation. A loss of synchronization because of a failure to obtain a full count group during high speed movement can be determined by not using the first pulse group after print speed stabilization for printing. Instead, the count check circuitry checks this first pulse group in the same manner as discussed above.

Figure 4A:
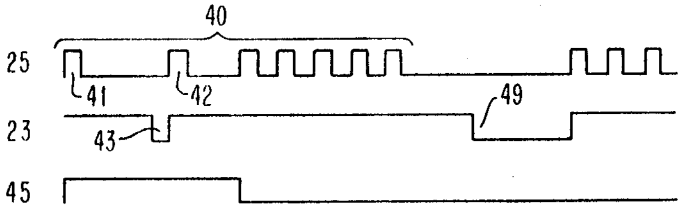
FIGS. 4A and 4B includes two sets of time-based diagrams depicting different operations of the FIG. 3 circuitry.
Figure 3:
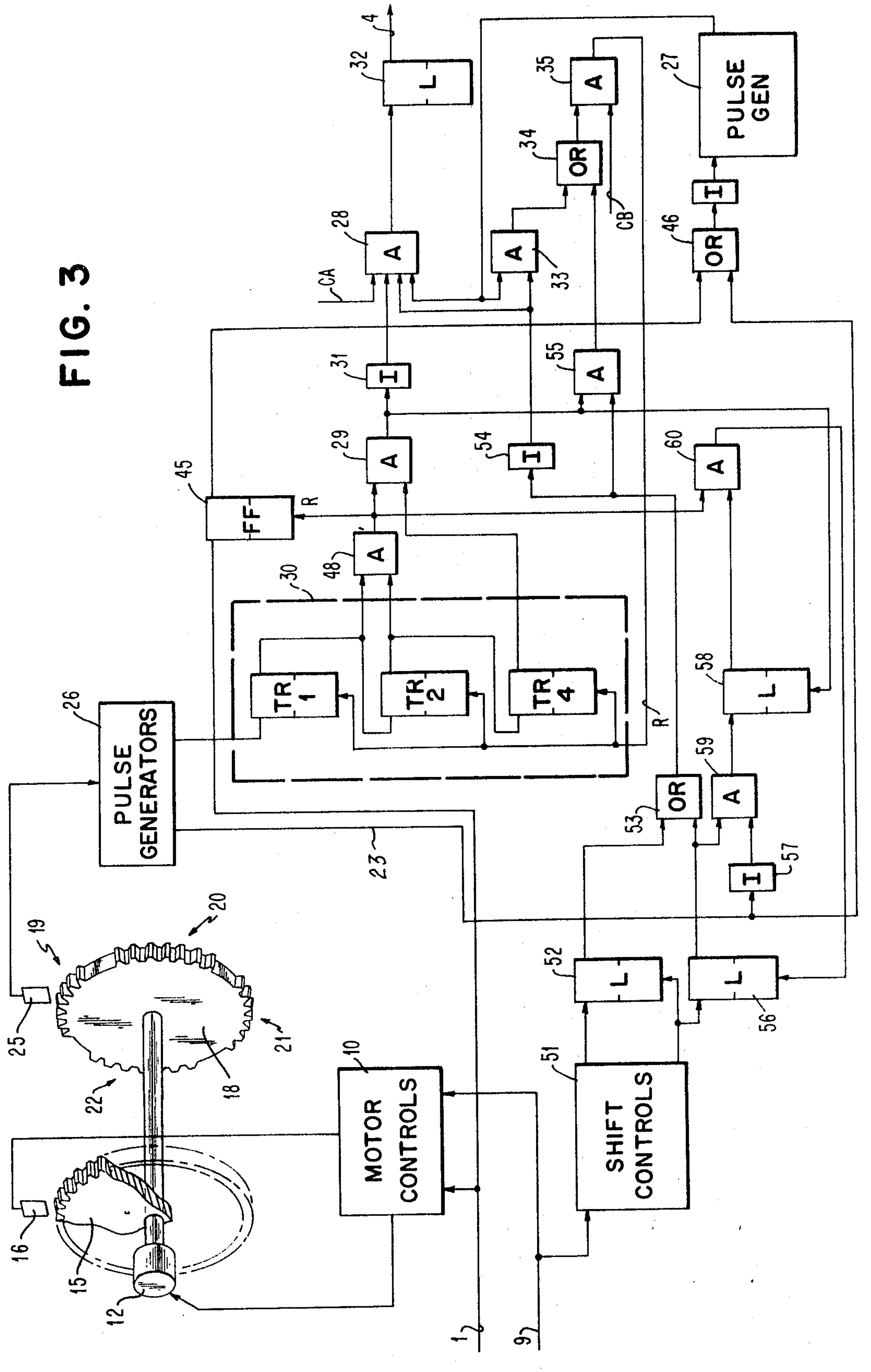
FIG. 3 is a detailed logic diagram showing the interrelation of the various aspects of the present invention.

FIG. 3 shows a detailed circuit diagram including the novel features mentioned above. The operation of various features of the FIG. 3 system will be described in conjunction with the time base diagram of FIG. 4. The waveform reference signals of FIG. 4 are directly correlated with like numbered components of FIG. 3. As mentioned, the invention particularly relates to controls used for serial wire matrix printers. The printing head is actually a single line of wires arranged vertically with respect to the paper on which the printing is to occur. This print head is moved horizontally across the paper with selected wires being energized to create printed characters by the combination of dots such as is shown in FIG. 1. Movement of the print head is controlled by logic circuitry 10 which drives stepping motor 12 in response to pulses produced from emitter wheel 15 and detector 16. The particular motor control logic 10 does not form an essential part of the invention. The motor 12 would be further coupled to effect movement of the print head (not shown) and is likewise directly coupled to emitter 18 as will be described hereinafter. Motor controls 10 respond to a signal at terminal 1 to start operations and respond to a signal at terminal 9 which determines whether the motor shall be driven at high or low speed. The signals at terminals 1 and 9 originate from the controlling data processing equipment and are utilized by other features of this invention as will be described below.

Characters are formed by a series of closely spaced vertical columns with the character spacing being provided by several blank columns. The emitter wheel 18 which is tied to the stepping motor drive and thus the horizontal movement of the print head includes a series of groups of teeth 19, 20, 21 and 22 separated by gaps. The number of teeth in each group 19–22 is a function of the number of vertical columns in which printing will occur for a given character. By way of example, groups 19–22 are shown with seven teeth each which cause pulses at detector 25. The pulse from any tooth on wheel 18 could be used for controlling the firing of all or selected ones of the print head wires in a given vertical column although the circuitry for doing this is not shown. The gap spacings between groups could be the equivalent of five teeth.

The pulses produced by detector 25 are introduced to pulse generator circuits 26 which responds thereto by producing two separate output signals. One such output signal 23 is produced by an integrator or single-shot circuit which produces an integrated emitter output that will stay up until a time has passed that is greater than the anticipated time between pulses produced by two successive teeth within a group on the emitter wheel 18 in normal operations. The other output from 26 is a series of count pulses, one for each pulse from emitter detector 25, for incrementing counter 30. When the integrated emitter 23 falls, pulse generator circuitry 27 would normally detect this condition, this fall occurring when detector 25 has encountered a gap. The width of the pulse produced by pulse generator 27 in response to the down pulse on 23 need only be sufficiently wide to accommodate the sequential occurrence of clock pulses CA and CB as will be readily understood from the following description. The output from circuit 27, among other things, will condition AND 28. A clock (not shown) will produce a pulse CA to interrogate AND 28 to determine whether a count of seven has been detected at AND 29. If the character generation is in proper synchronization, counter 30 will contain a seven whenever detector 25 reaches a gap between two emitter groups. Thus, if the printing is in sync, AND 29 would produce an output which, through invert 31, will decondition AND 28. In the event that the printing is not in sync, counter 30 will have some count other than seven and thus the interrogation of AND 28 would cause latch 32 to be set indicating a sync error.

The output of circuit 27 will also condition AND 33 and thus AND 35 via OR 34. A sequential clock pulse CB which occurs after CA will cause AND 35 to reset counter 30 preparatory for checking the next group of pulses regardless of whether or not an error was detected. Thus latch 32 could be reset by the output of 35 or by a special signal from the printer control unit (not shown).

For normal operation, the circuitry thus far described would be sufficient for sync checking. However, as mentioned previously two problems might be encountered which the remaining circuitry will accommodate. The first problem is that a startup operation frequently will produce pulses within a group in a character matrix which are separated by a sufficient length of time so as to permit the integrated emitter to timeout and produce an output pulse. This is shown in the FIG. 4A time base diagram at lines 23 and 25. The seven pulses making up group 40 might be produced by any one of the groups of teeth 19–22 on emitter wheel 18. Because of the startup delay, pulses 41 and 42 might be separated by a sufficient time to permit the fall of the integrated emitter at 43. With the circuitry thus far described, this condition would cause an apparent error to be detected since only a single count would have been stored in 30 when pulse 43 occurred whereas the print head has actually been operating correctly.

Flip-flop 45 is included as a start interlock in the logic circuitry to respond to the processor or control unit originated start signals introduced to input terminal 1. That is, the start signal 1 causes flip-flop 45 to provide an input to OR 46 thus preventing circuit 27 from responding to the fall of the integrated emitter. It has been found that a maximum of three pulses in a group is sufficient to insure that there will be no erroneous integrated emitter pulses and, therefore, AND 48 is coupled to detect a count of three in counter 30. This count is used to reset FF 45 so that circuit 27 can thereafter respond to a proper integrated emitter pulse such as is shown at 49. The two clock pulses CA and CB which would interrogate the sync check and reset the counter might occur during both the invalid emitter pulses 43 and the proper emitter pulse 49, but the operation of FF 45 prevents them from being effective during 43 as mentioned.

It should be noted that clock pulses CA and CB can be generated from any of a variety of well-known techniques. For instance, they might result from a pair of serially operated single-shot circuits responding in sequence to each pulse on line 23. Alternatively, they could originate from the printer control unit or computer with appropriate coordination with the FIG. 3 operation. Still further, they could originate from a free-running clock with appropriate interfacing to ensure that they are introduced to AND 28 and AND 35 with the correct timing relation for the other FIG. 3 operation.

The second problem which might be encountered relates to high speed movement of the print head. Normal printing operations are effected at a relatively slow speed by movement of the print head but high speed is desirable for such functions as tabbing or the like. There is no particular concern for checking sync during high speed movement but sync check must be again enabled when a print head is slowed to the print speed. For instance, the print head might be tabbed for a fixed distance and the high speed operation ceased so as to slow down the print head to the print speed at the desired printing location. At that point, sync checking is to be reinstituted but a reliable gap must be located before this can be done. Line 25 in FIG. 4B shows the space between pulses beginning to widen as the print head movement slows and, during this deceleration period, at least one integrated emitted pulse such as 50 can be anticipated before printing is to be commenced.

Shift controls 51 indicate high speed head movement by setting latch 52. The set output of latch 52 passes through OR 53 and deconditions ANDS 28 and 33 via invert 54. Thus any pulses produced on the integrated emitter while latch 52 is set cannot cause a sync check. Latch 52 stays set until the high speed command is dropped. However, the output of OR 53 will condition AND 55 so that each count of seven in counter 30 will cause a reset of counter 30 through OR 34 and AND 35. Note that if the circuitry for generating CB depends upon a signal on integrated emitter line 23, then a means of generating a substitute for CB must be provided. This could be effected by coupling the output of AND 55 to the counter reset via an OR circuit, the other input of which would be the output of AND 35. To complete such an arrangement, the output of AND 33 would be directly coupled as an input to AND 35 with OR 34 being eliminated.

Figure 4B:
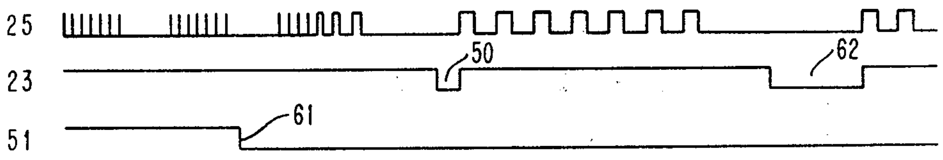

Assume that the shift controls has dropped from high to low speed operation as is shown at 61 in FIG. 4B. Pulses from detector 25 will begin to occur with greater width and spacing as the print head movement slows. Further, the shift signal at 9 via control 51 causes latch 52 to be reset while setting latch 56. The output of latch 56 will prevent sync check responses to integrated emitter pulses through OR 53 just as latch 52 had done before it was reset. The first drop in the integrated emitter line will be sensed by invert 57 so that latch 58 will be set via AND 59. The next count of three in counter 30 will cause AND 60 to be completely conditioned thereby resetting latch 56 and releasing circuit 27 so that it can respond to the next pulse 62 on the integrated emitter line 23. The following seven count will cause latch 58 to be reset preparatory for the next high speed/low speed shift. Note that the seven count following initial emitter pulse 50 will actually be checked by the operation of pulse generator 27 in response to pulse 62. This means that count errors other than a multiple of seven occurring during the high speed operation can be detected by controlling the speed shift and print energization timing so that no printing is effected during the first pulse group following the appearance of pulse 50. That is, a count of other than seven in counter 30 at the time pulse 62 arrived indicates a positional error occurred during the preceding high speed movement. A resulting signal at 4 can be used to decide whether this error is sufficiently significant to require corrective action or that it can be ignored. In either event, counter 30 is reset during pulse 62 and the system resynchronized for printing of the next character.

While the novel features and aspects of the present invention have been shown and described with reference to the preferred embodiment thereof, it will be understood by those skilled in the art that many changes of form and detail other than those mentioned herein may be made without departing from the spirit and scope of the invention.

What is claimed is:

1. In an apparatus wherein discrete groups of pulses having a normal time interval between recurrence of the pulses within a group and wherein said groups recur with intervening time gaps greater than said normal time interval, means for determining whether or not said groups each contain an acceptable number of pulses comprising;

counting means coupled to receive said pulses for counting said pulses as received, time-out means coupled to receive said pulses for responding thereto by producing an output signal indicative that a preselected time has passed since receipt of a given pulse without receipt of an intervening pulse, said preselected time being in excess of the said normal time interval but less than the time of said intervening gaps, means responsive to said time-out means output signal for inspecting the count contained in said counting means for producing a first output signal whenever said count is equivalent to other than the anticipated number of pulses in a group and a second output signal when said count is equivalent to the anticipated number of pulses in a group, and means responsive to said second output signal for resetting said counting means before the occurrence of the next pulse group.

2. Apparatus in accordance with claim 1 for handling predictable but acceptable abnormal pulse spacings within at least one of said groups which pulse spacing might cause said inspecting means to fail to produce proper output signals, said apparatus further including means for indicating that said abnormal pulse spacing is anticipated, and means responsive to said indicating means for preventing said inspecting means from producing an output signal until after said acceptable normal pulse spacing has occurred.

3. Apparatus in accordance with claim 2 wherein said preventing means responds to said indicating means for preventing said inspecting means from producing an output signal for at least the first two pulses in the first said pulse group received thereafter, whereby abnormal but acceptable pulse spacings in the initial pulse group of a series of pulse groups will not result in a false output signal from said inspecting means.

4. Apparatus in accordance with claim 2 wherein said indicating means causes said preventing means to be operable for a series of said pulse groups having abnormal but acceptable time spacings between groups and to be inoperative when said group spacings have returned to normal, said apparatus further including means responsive to said preventing means and to said counting means for reconditioning said counting means for counting subsequently received pulses whenever said counting means contains a count equivalent to the anticipated number of pulses within a pulse group, whereby said counting means will be continuously operable despite insufficient time gaps between pulse groups to permit operation of said inspecting means but said inspecting means will be permitted to return to normal operation after the said abnormal pulse group spacings have ceased.

5. Apparatus for determining that the correct number of pulses have occurred within each of a series of discrete pulse groups wherein the gap between pulse groups is greater than the gap between any two consecutive pulses within a said group comprising counter means coupled for counting said pulses, time-out means coupled to receive said pulses and for producing a signal whenever the spacing between received said pulses exceeds the normal spacing within a group, logic circuit means coupled for inspecting and interpreting the count contained in said counter means, pulse generating means responsive to signals from said time-out means for enabling said logic circuit means to inspect and interpret the count contained in said counter, a latch circuit, clock means for sequentially producing first and second clock pulses, said logic circuit means being coupled to respond to said first clock pulse when enabled by said pulse generating means for setting said latch circuit whenever said counter means contains a count other than the anticipated count representative of the number of pulses in a said pulse group, and said logic circuit means responding to said second clock pulse when enabled by said pulse generating means for resetting said counter means preparatory to counting the pulses of the next occurring said pulse group.

6. Apparatus in accordance with claim 5 which includes means for indicating that the next received pulse group will contain a predictable number of initial pulses having abnormally long pulse spacings, and means responsive to said indicating means for preventing said pulse generating means from enabling said logic circuit means until after a sufficient time period has passed for said abnormally occurring pulses to have been counted by said counter means.

7. Apparatus in accordance with claim 6 wherein said preventing means is coupled for being deactuated by the presence of a predetermined count in said counter means.

8. Apparatus in accordance with claim 5 which includes means for providing a signal indicating that the spacing between pulse groups will be abnormally but acceptably short, means responsive to said indicating means signal for preventing said logic means from setting said latch circuit and for coupling reset signals to said counter means whenever said counter means contains a full count.

9. Apparatus in accordance with claim 8 wherein said preventing means is constructed and arranged so as to require both the absence of a signal from said indicating means and the presence of said first pulse thereafter from said time-out means before permitting said logic means to respond to a subsequent signal from said time-out means, whereby setting of said latch circuit after release of said preventing means will indicate a failure of the number of pulses in at least one of the pulse groups received while said preventing means was operational.

* * * * *